(12) United States Patent
Benton

(10) Patent No.: US 6,351,280 B1
(45) Date of Patent: Feb. 26, 2002

(54) AUTOSTEREOSCOPIC DISPLAY SYSTEM

(75) Inventor: Stephen A. Benton, Lincoln, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/196,981

(22) Filed: Nov. 20, 1998

(51) Int. Cl.$^7$ .......................... H04N 13/04; H04N 13/00
(52) U.S. Cl. .............................. 348/51; 348/42; 348/57; 348/58
(58) Field of Search ........................ 348/39–40, 42–44, 348/46–51, 54, 56–58, 59; 359/23, 458, 462–464, 466–467, 470; 345/6, 139

(56) References Cited

U.S. PATENT DOCUMENTS

| | | | |
|---|---|---|---|
| 5,629,797 A | * 5/1997 | Ridgway | ..................... 359/464 |
| 5,644,427 A | 7/1997 | Omori et al. | |
| 5,703,717 A | 12/1997 | Ezra et al. | |
| 5,726,800 A | 3/1998 | Ezra et al. | |
| 5,774,175 A | 6/1998 | Hattori | |
| 5,777,588 A | 7/1998 | Woodgate et al. | |
| 5,808,792 A | 9/1998 | Woodgate et al. | |
| 5,818,399 A | 10/1998 | Omori et al. | |
| 6,069,649 A | * 5/2000 | Hattori | ......................... 348/51 |
| 6,239,830 B1 | * 5/2001 | Perlin | ........................... 348/51 |

OTHER PUBLICATIONS

Nishida et al., "Simplification of Infrared Illumination of Stereoscopic Liquid Crystal TV," SPIE vol. 2409 at 96 (1995).

Moore et al., "The implementation of a multi-view autostereoscopic display", IEEE Colloquium on Stereoscopic Television, IEEE 1992.*

Ezra, "Look, no glasses", IEE Review, IEEE 1996, pp. 187–189.*

Borner et al., "A family of single-user autostereoscopic displays with head-tracking capabilities", IEEE Trans. on Circuits and Systems for Video Technology, vol. 10, No. 2, Sep. 2000, pp. 234–243.*

* cited by examiner

Primary Examiner—Vu Le
(74) Attorney, Agent, or Firm—Testa, Hurwitz & Thibeault, LLP

(57) ABSTRACT

An autostereoscopic display system is capable of tracking one or more users within a viewing zone and presenting complementary stereoimages to each of the viewer's (or viewers') eyes. Polarization is used to segregate the images that are to be directed to different spatial regions. The two images are interdigitated within a single display—that is, each band of image points from the first image alternates with a band of image points from the second image on the display. The bands of the first image are polarized in a first mode and the bands of the second image are polarized in a second mode orthogonal to the first, e.g., through use of a liquid-crystal display (LCD) in which alternating, contiguous bands of pixels correspond to bands of one or the other image, and a "patterned polarizer" also organized into bands and aligned with the pixel bands. Autostereoscopic viewing is facilitated by a display (such as an LCD) that is illuminated by light from an outside source whose polarization can be controlled. Illumination from the light source passes through a focusing lens and then through the patterned polarizer and display so as to form a "real" or "aerial" image of the display in the viewing zone, with the different images directed to different regions of the viewing zone.

13 Claims, 3 Drawing Sheets

AUTOSTEREOSCOPIC DISPLAY SYSTEM

This invention was made with government support under Grant Number N00014-96-1-1200 awarded by the Department of the Navy. The government has certain rights in the invention.

FIELD OF THE INVENTION

The present invention relates to creation and viewing of three-dimensional moving or still images, and in particular to "autostereoscopic" systems that do not require special wearable peripheral devices.

BACKGROUND OF THE INVENTION

For well over a century, researchers have proposed and developed a variety of devices that allow viewing of images or graphic designs in three dimensions. The concept of true "stereoscopic" viewing holds tremendous potential for applications ranging from entertainment to scientific visualization and basic research. Stereoscopically portrayed stories and events carry the impact and immediacy of genuine realism, allowing viewers to be drawn into an experience with the sense that they are truly there.

Efforts to date have largely been confined to specific, controlled environments. For example, for decades moviegoers have donned special glasses to view stereoscopic films; for this application, the restricted presentation atmosphere and a captive audience willing to tolerate special viewing aids facilitated use of relatively unsophisticated optical arrangements. Similar audience receptivity underlies the current generation of commercial "virtual reality" devices, which require the user to wear full-vision headgear that imparts an "immersive" three-dimensional environment.

Displays involving eyeglasses or headgear control what enters the eyes rather than what exits the display. The wearable apparatus covering the user's eyes allows separate information to be provided to each eye. The left-eye and right-eye images differ in perspective but not content, so the viewer integrates the images into a single, stereoscopic picture. Early three-dimensional film systems displayed left-eye and right-eye images in separate colors, which were directed to the appropriate eye by special glasses having lenses tinted with one or the other of these colors. More recent adaptations of this approach code the left-eye and right-eye images with orthogonal polarizations, and utilize eyeglasses with orthogonally oriented polarizers.

The disadvantages to systems that require eyeglasses or wearable headgear are numerous and well-known. Beyond the inconvenience and unnaturalness of wearing an appliance, the user may also experience headaches or eye strain. Head-mounted displays suffer the additional disadvantage of being single-user devices, isolating viewers from one another and preventing them from sharing the threedimensional experience with others.

Another popular form of stereoscopic display relies on lenticular optical technology, which utilizes a linear array of narrow cylindrical lenses to create separate spatial viewing zones for each eye. Image information for the different viewing zones is spatially separated in the back focal plane of the cylindrical lenslets, allowing the lenslets to direct this information only to a narrow area of the viewing plane. Recent adaptations of this approach utilize liquid crystal display (LCD) panels or LCD-projected images to provide an updatable display medium for creating the spatially separated information behind the cylindrical lenses. Lenticular displays also suffer from certain drawbacks, however, such as poor image resolution (due both to the need to divide the overall resolution of the single image-producing device over a plurality of viewing zones, and to diffraction). Lenticular designs are also difficult to adapt to multi-user environments.

Other approaches to stereoscopic image presentation include so-called "volumetric" displays (which utilize a medium to fill or scan through a three-dimensional space, small volumes of which are individually addressed and illuminated), and electronic holography displays. Both of these types of display require rapid processing of enormous quantities of data, even for lower resolution images, and both have significant obstacles to overcome when the displays are scaled up to accommodate larger image sizes. In addition, the volumetric displays produce transparent images which, while suitable for applications (such as air-traffic control or scientific visualization) where the illusion of solidity is less important than a wide viewing zone, do not typically provide a fully convincing experience of three-dimensionality.

Macro-optic display systems utilize large-scale optics and mirrors, as opposed to lenticular displays, to deliver each image of a stereopair to a different viewing zone. A system designed by Hattori et al. (see Hattori et al., "Stereoscopic Liquid Crystal Display," *Proc. Telecom. Advance. Org. (TAO) 1st Int'l. Symp.* (1993)) utilizes two LCDs, one providing left-eye information and the other providing right-eye information. The outputs of both LCDs are combined by a beamsplitter, with the light passing through each LCD being focused to a separate viewing zone. The Hattori et al. system utilizes a monochrome cathode-ray tube (CRT) monitor behind each LCD as the illuminating light source. Each monochrome monitor is driven by a camera that records the viewing area in front of the display, capturing a picture of the viewer. A pair of infrared (IR) illuminators, each emitting at a different wavelength, are angled toward the viewer from different sides. Each recording camera is equipped with a bandpass filter tuned to the emitting frequency of one or the other IR illuminator. Because the illuminators each face the viewer at an angle, one of the cameras records an image of the left side of the viewer's face, while the other records an image of the right side. A Fresnel lens near each LCD projects the left-side or right-side image of the viewer's face, as appropriate, onto the corresponding side of the viewer's actual face. As a result, the image information from each LCD reaches only the appropriate left or right eye; for example, because light passing through the left-eye image LCD goes only to the left side of the viewer's face, the viewer's left eye sees only left-eye information. As the viewer moves within the viewing space, the image on the monitors moves with him, so the viewing zones for the left-eye and right-eye images remain properly positioned over the viewer's left and right-eyes.

This type of display offers a number of advantages over prior designs. It is "autostereoscopic," so that the user receives a three-dimensional image without special wearable peripheral devices. It is capable of delivering three-dimensional images to a moving viewer anywhere within the viewing area, and can accommodate several viewers at once. In addition, because the system uses LCDs as the primary image source for the stereopairs, it is capable of generating strongly realistic, full-color images of naturalistic scenes (as well as displaying ordinary two-dimensional television or other information). And since only two LCDs are used, the total amount of information needed to drive the display is only twice that of a standard television or monitor.

The Hattori et al. design poses problems in terms of scalability, however. Because the viewer-tracking system is implemented with CRTs, larger displays will require proportionally larger CRTs and more powerful lenses. As a result, the display size, cost, and complexity expand dramatically with increase in the size of the stereoscopic image. Moreover, because this design requires a final beamsplitter to be placed between the display medium and the viewer, the resulting three-dimensional images give the psychological impression of being inaccessible to the viewer; this arises from the fact that stereoscopic images display the least distortion when the three-dimensional content is localized at or near the surface of the display medium, which is positioned behind the final beamsplitter. Other limitations of the design stem from shortcomings that generally affect CRT displays, such as varying image intensities.

Another macro-optical design was recently proposed by Ezra et al. (see Ezra et al., "New Autostereoscopic Display System," SPIE Pro. #2409 (1995)). Starting once again with two image LCDs combined by a beamsplitter, an additional system of fold mirrors and another beamsplitter were added to allow both LCDs to be backlit by a single light source. A lens disposed near each LCD images the single light source to the eyes of the viewer. These lenses are laterally offset by a slight amount from the optical axis of the LCDs so that two separate images of the light source are created in the viewing area. Light passing through the left-eye LCD forms an image of the light source near the viewer's left eye, while light passing through the right-eye LCD forms an image of the light source near the viewer's right eye. By moving the light source behind the two LCDs, the left-eye and right-eye viewing zones can be moved to follow a viewer within the viewing area. To accommodate additional viewers, additional "dynamic light sources" can be added so as to create further viewing zones. More recently, this group proposed handling multiple viewers with a single, specialized illumination component rather than multiple individual light sources. This specialized component consists of a number of thin, vertical cold-cathode sources arranged in a one-dimensional array. See Woodgate et al., "Observer Tracking Autostereoscopic 3D Display Systems," SPIE Proc. #3012A (1997).

This system shares many of the advantages of the Hattori et al. design described above, and overcomes the difficulties stemming from multiple illumination sources. Once again, however, the ability to scale the Ezra et al. system can be problematic. The two LCDs and the beamsplitter occupy a large space for a display of only modest three-dimensional size. As in the Hattori et al. system, the three-dimensional image is "trapped" behind the output beamsplitter, making the images seem inaccessible. Finally, the array of cold-cathode sources have a limited on/off switching speed, creating possible lags in tracking speed.

DESCRIPTION OF THE INVENTION

BRIEF SUMMARY OF THE INVENTION

The present invention offers an autostereoscopic display system that is capable of tracking one or more users within a viewing zone and presenting complementary stereoimages to each of the viewer's (or viewers') eyes. More broadly, the invention is useful in any context requiring the directing of separate images to distinct spatial regions. For example, the images generated by the invention can be directed to different viewers (rather than the left and right eyes of a single viewer), so that viewers observing the same display device can view different images. Although the ensuing discussion is directed toward generation of stereoimages for a single viewer, it should be understood that this is for convenience of presentation only.

In accordance with the invention, polarization is used to segregate the images that are to be directed to different spatial regions. The two images are interdigitated within a single display—that is, each row (or column) of image points from the first image alternates with a row (or column) of image points from the second image on the display. (For ease of explanation, each row or column of image points is herein referred to as a "band" so as not to specify a vertical, horizontal or other orientation.) As a result, the resolution of the image is half the resolution of which the display is capable, since that resolution is split between the two images. The bands of the first image are polarized in a first direction and the bands of the second image are polarized in a second direction orthogonal to the first. This may be accomplished, for example, using an LCD in which alternating, contiguous bands of pixels correspond to bands of one or the other image, and a "patterned polarizer" also organized into bands that are aligned with the pixel bands.

Such differentially polarized images could be viewed, for example, through conventional polarized "3D eyeglasses" in which each eyepiece is a polarizer oriented in a different direction, i.e., the first or second direction. Since these directions are orthogonal, each of the wearer's eyes would see only one of the two images. But the present invention facilitates autostereoscopic viewing by a user who is stationary or moving within a viewing zone. This is accomplished by utilizing a display (such as an LCD) that is illuminated by light from an outside source whose polarization can be controlled. Illumination from the light source passes through a focusing lens and then through the patterned polarizer and display so as to form a "real" or "aerial" image of the display in the viewing zone.

For stereoscopic applications, a viewer-locating means may acquire a facial image fragment of the viewer; as used herein, the term "facial image fragment" refers to a portion of the viewer's face or a bounded region that includes a portion of the viewer's face, and may include, or be limited to, a first one of the viewer's eyes. For example, a camera at the front of the display may capture a picture of the viewer with one side of his face illuminated by an IR source. This embodiment further comprises means for generating a tracking output image, the output image comprising a first region of light polarized in the first polarization direction and substantially conforming to the facial image fragment, and a second region of light polarized in the second polarization direction (orthogonal to the first polarization direction). The facial image fragment is focused onto a corresponding portion of the viewer's face through the display. As a result, this arrangement presents illumination from the first-image bands to the first eye of the viewer and illumination from the second-image bands to the viewer's other eye. This is because the user's first eye receives light polarized in the first direction (and therefore sees only the first image) while the user's other eye receives light polarized in the second direction (and therefore sees only the second image). The images may represent a single, still stereopair or may instead change rapidly over time to convey movement.

Alternatively, differential polarization of the illumination source can be used to provide different images to different viewers within the viewing zone. Indeed, using a robust tracking system capable of locating not only multiple viewers but the positions of their eyes as well, it is possible to provide the illumination source with a pattern of different polarizations that direct the different stereoimages to the proper eyes of all viewers.

The invention also embodies methods relating to the above-described systems and various components thereof.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
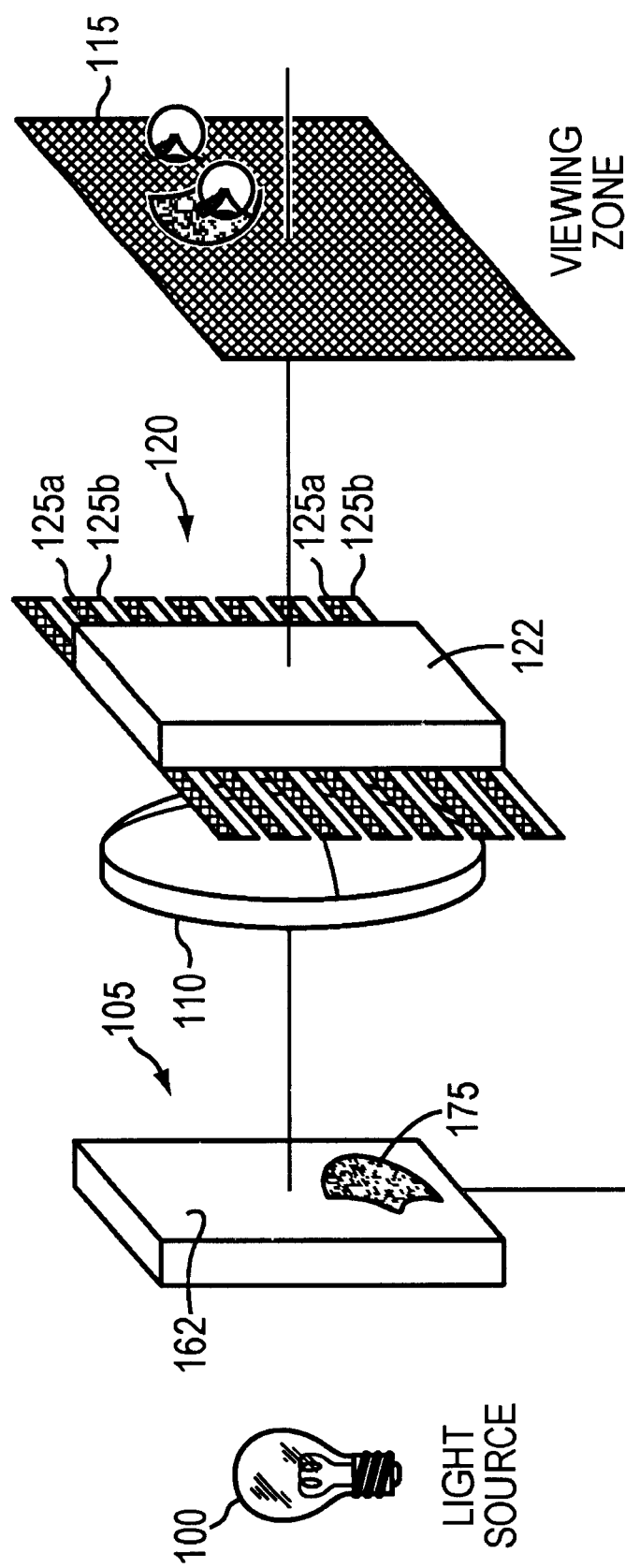
FIG. 1 schematically illustrates an implementation of the invention.

FIG. 1 illustrates the components of the invention and their operation. A light source 100 (which may include a diffuser) illuminates a viewer-tracking polarizer 105, the operation of which is described in greater detail below. Light exiting from viewer-tracking polarizer 105 is focused by a positive lens 110 (which may be a Fresnel lens) into a viewing zone 115, forming thereon a "real" or "aerial" image of viewer-tracking polarizer 105. Accordingly, the light arriving at any small area of viewing zone 115 comes only from a correspondingly small area of viewertracking polarizer 105.

Before reaching viewing zone 115, however, light from viewer-tracking polarizer 105 passes through a patterned polarizer 120 and an image display 122 (e.g., an LCD display); the illumination from viewer-tracking polarizer 105 causes the contents of display 122 to become visible to a viewer. Patterned polarizer 120 consists of an alternating series of polarizing bands 125a, 125b oriented in first and second orthogonal directions. For example, one set of bands 125a, 125b may have a vertical polarization and the set other a horizontal polarization, or one set may be polarized at 45° and the other at 135°.

Display 122 comprises a grid of pixels that are set so as to display two interdigitated images; in the arrangement shown in FIG. 1, each row of image points from the first image alternates with a row of image points from the second image. Each set of polarizer bands 125a, 125b is aligned with the lines of one of the images; thus, the lines of each image are polarized in the first and second orthogonal directions. For example, patterned polarizer 120 may have bands spaced ⅙ mm (about 160 µm) apart, resulting in an effective image resolution of ⅓ mm. Such a patterned polarizer is available commercially from, e.g., VRex, Inc., Hawthorne, N.Y. Desirably, a single row of display pixels is aligned with each polarizer band.

Viewer-tracking polarizer 105 creates a tracking output image having a region of light polarized in the first direction and a region of light polarized in the second direction; by virtue of focusing lens 110, these regions appear within viewing zone 115. A representative viewer-tracking polarizer is shown in FIG. 2. The operation of this device is best understood with reference to a conventional LCD display. Such a display ordinarily comprises a thin layer of liquid crystal material sandwiched between two glass plates, each of which has an electrical conducting layer deposited thereon. When the inside surfaces of the glass plates have been properly treated, the molecules of the liquid crystal material are forced to align so as to rotate helically from one glass plate to the other. Light passing through this sandwich is forced to rotate its polarization in accordance with the rotated conformation of the liquid crystal molecules, this degree of rotation often being 90°. When a voltage of sufficient magnitude is applied between the two glass plates, however, the liquid crystal molecules no longer form a rotational path from one plate to the other, and the polarization of light passing through the material is therefore unaffected. The liquid crystal material is selectably addressable (e.g., through arrangement in a pattern of cells or "pixels," which create the resolution of the display) so that the molecules can be electrically stimulated or left unstimulated in accordance with a desired pattern; as a result, the polarization of light passing through the liquid crystal material is altered or left unaffected in accordance with that pattern.

In many conventional LCDs used for display purposes, the sandwiched liquid crystal material is placed between two crossed polarizers. The first polarizer preconditions the light so that only one polarization passes through the liquid crystal sandwich. When the polarized light passes through a pixel across which no voltage is applied (an "off" pixel), the polarization of the light rotates 90° and, as a result, exits through the final polarizer. Light passing through an activated (or "on") pixel, however, is not altered in polarization and is therefore absorbed by the final polarizer. The LCD acts as a restrictive light valve with respect to a source of illumination on either side of the LCD, selectively passing or blocking the light in accordance with the pixel pattern.

Figure 2A:
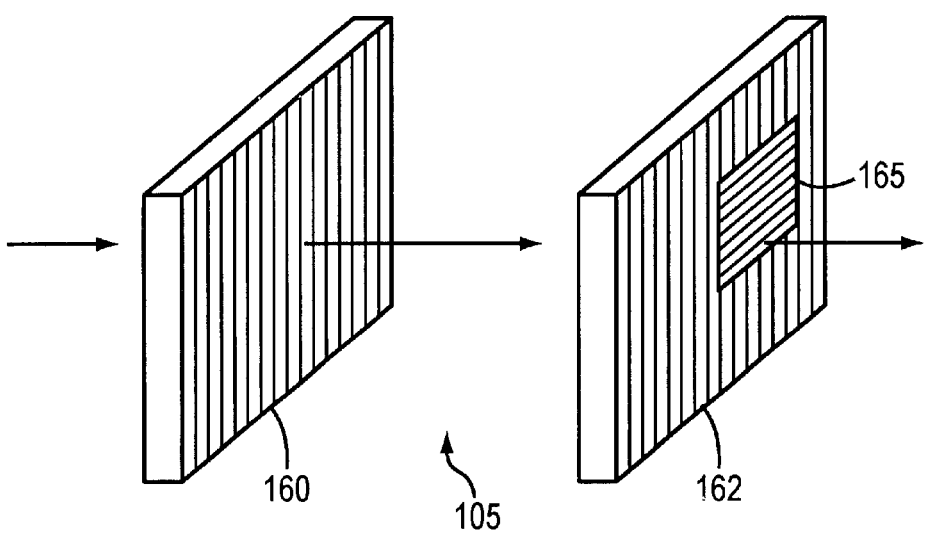
FIG. 2A is an exploded isometric view of a viewer-tracking polarizer in accordance with the invention.

With reference to FIG. 2A, viewer-tracking polarizer 105 may comprise a linear polarizer 160 and an addressable liquid crystal sandwich element 162. Polarizer 160 allows only one polarization component of incoming light to pass through; in the figure, plate 160 is configured to pass vertically polarized light. A controller 150 (see FIG. 1), which receives position data from a viewer-tracking system as described below, controls the pixels of liquid crystal element 162. As shown in FIG. 2A, element 162 may be operated by controller 150 such that the polarization of light passing through a small rectanglar region 165 rotates by 90° the light passing therethrough, while the polarization of light passing through the remainder of element 162 is unaffected. Light source 100 and diffuser 102 are located behind polarizer 160, so that polarizer 160 preconditions the light before it reaches element 162. Exiting element 162, therefore, is a light image having separate regions of crossed polarizations.

Due to the optical geometry of the arrangement shown in FIG. 1, the position of rectangle 165 within the area of element 162 determines where that rectangle 165 will be focused within viewing zone 115. Accordingly, the rectangle of light whose polarization has been rotated may be directed to any desired point within viewing zone 115 merely by choosing its position on element 162.

Viewer-tracking polarizer 105 may be operated in conjunction with polarizing bands 125a, 125b to direct each of two stereoimages presented (in an interdigitated fashion) on display 122 to the proper eye of the viewer. Suppose, for example, that rectangular region 165 is horizontally polarized as shown while the remainder of the light passing through element 105 is vertically polarized; that polarizer bands 122a pass only the horizontally polarized component of incoming light and are aligned with the left stereoimage of display 122; and that polarizer bands 122*b* pass only the vertically polarized component of incoming light and are aligned with the right stereoimage.

Therefore, although light emanating from the entire face of viewer-tracking polarizer 105 is focused into viewing zone 115, only the light from rectangle 165 can pass through polarizer 122*a* to viewing zone 115; and so long as rectangle 165 is positioned so that its image reaches the viewer's left eye, the left stereoimage from display 122 (which is illuminated by light from rectangle 165) also reaches the viewer's left eye. Similarly, only the light emanating from regions other than rectangle 165 can pass through polarizer 122*b*. This light reaches regions within viewing zone 115 that include the viewer's right eye but not his left eye, so the viewer's right eye perceives the right stereoimage from display 122. As a result, a three-dimensional impression is formed.

This arrangement can accommodate multiple viewers. When a new viewer enters the viewing zone, controller 150 creates another polarization-altering rectangle within viewer-tracking polarizer 105 and positions this to follow the new viewer's right eye. Additional viewers can be accommodated so long as the rectangles do not occupy an excessive amount of the area of element 162.

Figure 2B:
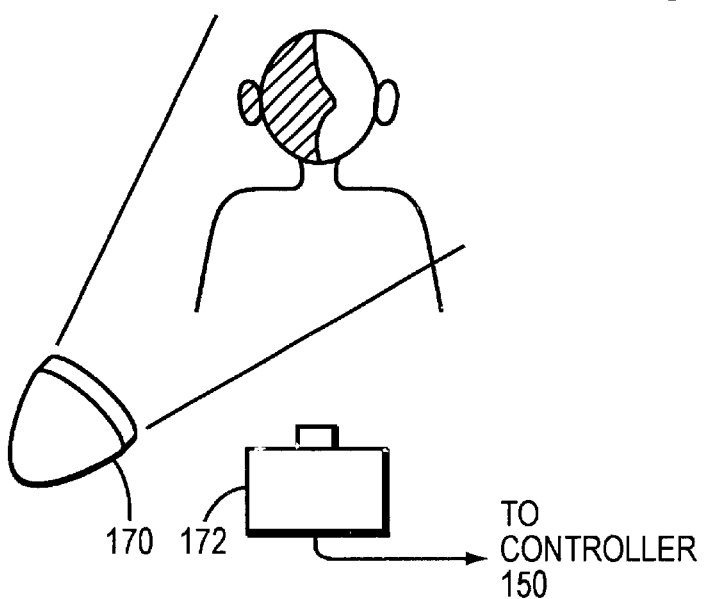
FIG. 2B schematically depicts a preferred tracking system.
Figure 2C:
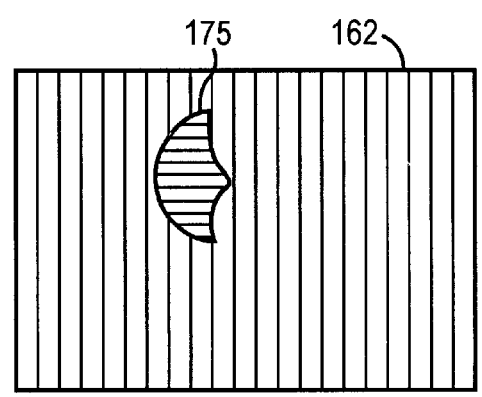
FIG. 2C illustrates operation of the viewer-tracking polarizer shown in FIG. 2A in accordance with the output of the tracking system shown in FIG. 2B.

Refer now to FIG. 2B, which illustrates a tracking system useful in conjunction with this embodiment of the invention. A source 170 of non-visible (e.g., IR, ultraviolet (UV), etc.) radiation is aimed at the viewer so that, when the viewer is within the viewing zone (i.e., the physical boundaries within which the invention can operate), source 170 illuminates one side of his face. A camera 172 that is sensitive only to the non-visible radiation is positioned in front of the display so as to monitor the entire viewing zone (for example, if source 170 emits IR radiation, camera 172 may be fitted with an IR bandpass filter). The output of camera 172, then, is a facial image fragment corresponding to one side of the viewer's face (and including, most critically, one of the viewer's eyes). The output of camera 172 is provided to controller 150. The controller is programmable and is provided with the camera and viewing geometry. Based on the location of the facial image fragment within the camera field and the known camera and viewing geometry, controller 150 is able to straightforwardly create a pixel pattern 175 on element 162 (see FIG. 2C) conforming to the facial image fragment, and to position pattern 175 such that light passing through the pixels will be directed back onto the actual viewer's face to overlie the region illuminated by source 170.

Lens 110 may magnify the image formed by viewer-tracking polarizer 105 substantially (subtending, for example, a horizontal angle of 70° or more), so that its appearance in the viewing zone 115 is much larger than the actual size of the polarizer itself. The magnification of lens 110 does not, however, affect the sharpness of the viewed image, since display 122 is viewed more or less directly (that is, no projection or magnification of the images on display 122 occurs); the light emerging from viewer-tracking polarizer 105, while magnified, merely illuminates display 122. Consequently, the quality of image 122 does not depend substantially on the quality of lens 110. Of course, the quality of lens 110 does determine the precision with which pattern 175 is focused within viewing zone 115 (at a given magnification). In practice, it is found that pattern 175 can blur out by as much as approximately 25 mm (one inch); this allows some flexibility in choosing a lens for a particular degree of magnification.

Figure 3:
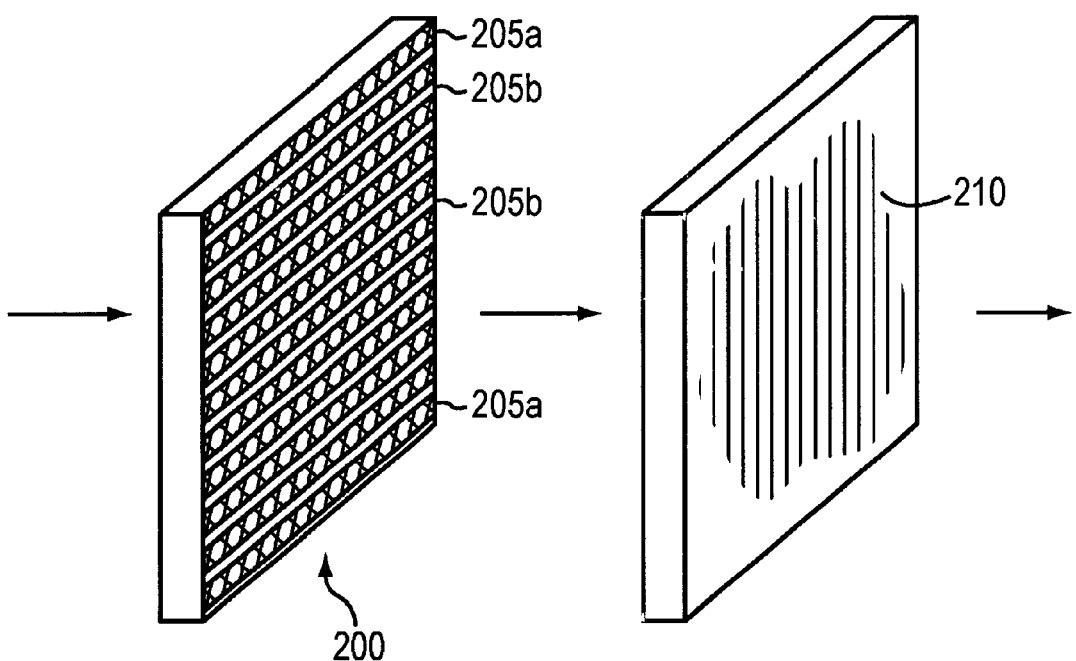
FIG. 3 schematically illustrates use of a patterned retarder and linear polarizer in lieu of a patterned polarizer.

It is possible to replace the patterned linear polarizer described above with a patterned half-wave retarder and a linear polarizer, as shown in FIG. 3. A half-wave retarder is a material that introduces a 180° phase difference between polarization vector components along a "fast" (unaffected) axis and an orthogonal "slow" axis. Such a retarder may effectively rotate the polarization of incoming light by 90° when the fast axis is aligned at 45° to the polarization of the incoming light. The patterned half-wave retarder 200 used herein is arranged in a set of bands 205*a*; an interdigitated set of bands 205*b* passes light without modification. A linear polarizer 210, oriented in the same direction as polarizer 160 (see FIG. 2A), is disposed between patterned retarder 200 and display 122 (see FIG. 1).

In operation, the light from viewer-tracking polarizer 105 includes two regions of orthogonal polarization, namely, the pattern 175 and the background region. Assuming, once again, that light outside fragment 175 is vertically polarized (i.e., that plate 160 is vertically oriented), polarizer 210 will also be vertically polarized. This light passes through bands 205*b* and then through vertical polarizer 210, illuminating the interdigitated image in display 122 aligned with bands 205*b* so as to present this image in the viewing zone 115 (see FIG. 1) to the viewer's right eye. The vertically polarized light passing through bands 205*a* is rotated into horizontal polarization, and does not pass through polarizer 210 to illuminate the other interdigitated image.

Horizontally polarized light from fragment 175 is rotated into vertical polarization by retarder bands 205*a* and passes through polarizer 210 and the interdigitated image aligned with bands 205*a* so as to present this image in the viewing zone 115 to the viewer's left eye. The horizontally polarized light passing through bands 205*b* is not rotated and therefore does not pass through polarizer 210 to illuminate the other interdigitated image.

An advantage to this design over a patterned polarizer is the ease with which it may be manufactured. In particular, the light-altering properties of a polymeric half-wave plate or sheet may be selectively destroyed by heating, so that the plate passes unmodified light where heat has been applied. Accordingly, bands 205 can be impressed onto a conventional half-wave sheet using a heated die or a shaped tool.

It should be emphasized that the use of orthogonal linear polarizations is exemplary only. It is also possible to utilize other orthogonal modes of polarization, such as left and right circular polarizations.

It will therefore be seen that the foregoing approach to stereoscopic image display is straightforwardly implemented, providing highly realistic images without the need for viewers to wear special equipment or to remain motionless at a designated location. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for presenting a plurality of images, the apparatus comprising:
   a. means for establishing a target zone for a first image;
   b. means for generating a tracking output image, the output image comprising a first region of light polarized in a first polarization mode and substantially correlated to the target zone, and a second region of light polarized in a second polarization mode distinct from the first polarization mode;
   c. a display for receiving light from the tracking output image to produce first and second images, each of the images comprising a series of bands, the first-image bands alternating contiguously with the second-image bands;

d. means for polarizing light illuminating the first image in a first polarization mode; and e. means for polarizing light illuminating the second image in a second polarization mode, the first and second polarization modes being orthogonal to each other, the light from the tracking output image being directed so as to cause the first image to appear in the target zone and the second image to appear elsewhere.

2. The apparatus of claim 1 wherein:

a. the means for establishing a target zone comprises viewer-locating means for acquiring a facial image fragment of a viewer, the facial image fragment including a first one of the viewer's eyes;

b. the first region of light is correlated to the facial image fragment;

c. the first and second image sources produce complementary stereoimages; and d. the means for causing the light from the tracking output image to illuminate the display image sources causes the first region of light to be focused onto a corresponding portion of the viewer's face through the display such that the first image is presented to the first eye of the viewer and the second image source to the other eye of the viewer.

3. The apparatus of claim 2 wherein the means for directing the tracking output image comprises a lens, the target zone being located a distance away from the lens, the lens forming a real image at the distance through the display.

4. The apparatus of claim 1 wherein the means for generating a tracking output image comprises:

a. an illumination source; and b. a display comprising (i) a polarizer to pre-condition light from the illumination source into a single polarization mode, and (ii) a polarization-altering medium, the medium altering the polarization of light between first and second polarization modes in response to an externally applied stimulus, the medium being arranged in a pattern of cells each addressably responsive to the stimulus, the polarizer intervening between the illumination source and the polarization-altering medium.

5. The apparatus of claim 4 wherein the means for polarizing light illuminating the first image in a first polarization mode and the means for polarizing light illuminating the second image in a second polarization mode are, collectively, (i) a patterned half-wave retarder comprising sets of alternating bands, a first set of bands rotating the polarization of light by 90° and being aligned with the bands of the first image, and a second set of bands not affecting the polarization of light and being aligned with the bands of the second image, and (ii) a polarizer aligned with the pre-conditioning polarizer.

6. The apparatus of claim 4 wherein the means for polarizing light illuminating the first image in a first polarization mode and the means for polarizing light illuminating the second image in a second polarization mode are, collectively, (i) a patterned half-wave retarder comprising sets of alternating bands, a first set of bands not affecting the polarization of light and being aligned with the bands of the first image, and a second set of bands rotating the polarization of light by 90° and being aligned with the bands of the second image, and (ii) a polarizer aligned with the pre conditioning polarizer.

7. The apparatus of claim 1 wherein the means for polarizing light illuminating the first image in a first polarization mode and the means for polarizing light illuminating the second image in a second polarization mode are, collectively, a patterned polarizer having sets of alternating bands, a first set of bands polarizing light in the first polarization mode and being aligned with the bands of the first image, a second set of bands polarizing light in the second polarization mode and being aligned with the bands of the second image.

8. A method of for presenting a plurality of images, the method comprising the a. establishing a target zone for a first image;

b. generating a tracking output image image comprising a first region of light polarized in a first polarization mode and substantially correlated to the target zone, and a second region of light polarized in a second polarization mode distinct from the first polarization mode;

c. providing a display for receiving light to produce first and second images, each of the images comprising a series of bands, the first-image bands alternating contiguously with the second-image bands;

d. causing light from the tracking output image to illuminate the display;

e. polarizing the light illuminating the first image in a first polarization mode;

f. polarizing the light illuminating the second image in a second polarization mode, the first and second polarization modes being orthogonal to each other; and g. causing the first image to appear in the target zone and the second image to appear elsewhere.

9. The method of claim 8 wherein the first and second image sources produce complementary stereoimages, and further comprising the steps of:

a. acquiring a facial image fragment of a viewer, the facial image fragment including a first one of the viewer's eyes;

b. correlating the first region of light to the facial image fragment;

c. causing the first region of light to be focused onto a corresponding portion of the viewer's face through the display such that the first image is presented to the first eye of the viewer and the second image source to the other eye of the viewer.

10. The method of claim 8 wherein the tracking output image is generated according to steps comprising:

a. pre-conditioning light from an illumination source into a single polarization mode, and b. selectively altering the polarization of light between first and second polarization modes.

11. The method of claim 10 wherein the polarizing steps are performed by a patterned half-wave retarder comprising sets of alternating bands, a first set of bands rotating the polarization of light by 90° and being aligned with the bands of the first image, and a second set of bands not affecting the polarization of light and being aligned with the bands of the second image, and (ii) a polarizer aligned with the pre-conditioning polarizer.

12. The method of claim 8 wherein the polarizing steps are performed by a patterned polarizer having sets of alternating bands, a first set of bands polarizing light in the first polarization mode and being aligned with the bands of the first image, a second set of bands polarizing light in the second polarization mode and being aligned with the bands of the second image.

13. The method of claim 4 wherein the polarizing steps are performed by a patterned half-wave retarder comprising sets of alternating bands, a first set of bands not affecting the polarization of light and being aligned with the bands of the first image, and a second set of bands rotating the polarization of light by 90° and being aligned with the bands of the second image, and (ii) a polarizer aligned with the preconditioning polarizer.

* * * * *